United States Patent
Shaffer et al.

(10) Patent No.: US 7,209,475 B1
(45) Date of Patent: Apr. 24, 2007

(54) SYSTEM AND METHOD FOR PROVIDING ON-HOLD CONTENT IN A VOICE OVER INTERNET PROTOCOL (VOIP) ENVIRONMENT

(75) Inventors: Shmuel Shaffer, Palo Alto, CA (US); Shantanu Sarkar, San Jose, CA (US); Thiyagesan Ramalingam, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1190 days.

(21) Appl. No.: 10/035,679

(22) Filed: Dec. 28, 2001

(51) Int. Cl.
*H04L 12/66* (2006.01)
(52) U.S. Cl. ...................... 370/355; 370/356
(58) Field of Classification Search ............... None
See application file for complete search history.

(56) References Cited

U.S. PATENT DOCUMENTS

| | | | |
|---|---|---|---|
| 5,838,683 A | 11/1998 | Corley et al. | 370/408 |
| 6,400,804 B1 * | 6/2002 | Bilder | 379/76 |
| 6,526,041 B1 | 2/2003 | Shaffer et al. | 370/352 |
| 6,545,589 B1 | 4/2003 | Fuller et al. | 340/7.22 |
| 6,683,938 B1 | 1/2004 | Henderson | 379/67.1 |
| 6,707,797 B1 | 3/2004 | Gardell et al. | 370/260 |
| 2001/0012335 A1 * | 8/2001 | Kaufman et al. | 379/67.1 |
| 2001/0028649 A1 | 10/2001 | Pogossiants | 370/389 |
| 2002/0136384 A1 | 9/2002 | McCormack et al. | 379/215.01 |
| 2002/0146106 A1 * | 10/2002 | Himmel et al. | 379/215.01 |
| 2002/0176404 A1 | 11/2002 | Girard | 370/352 |
| 2003/0035471 A1 | 2/2003 | Pitsoulakis | 375/222 |
| 2003/0112927 A1 * | 6/2003 | Brown et al. | 379/67.1 |
| 2003/0118003 A1 | 6/2003 | Geck et al. | 370/352 |
| 2003/0161464 A1 * | 8/2003 | Rodriguez et al. | 379/266.01 |
| 2004/0047359 A1 | 3/2004 | Jacobs et al. | 370/402 |
| 2004/0047461 A1 | 3/2004 | Weisman et al. | 379/202.01 |
| 2004/0052242 A1 | 3/2004 | Laturell | 370/352 |
| 2004/0128192 A1 * | 7/2004 | Paluszek et al. | 705/14 |
| 2005/0216346 A1 * | 9/2005 | Kusumoto et al. | 705/14 |
| 2005/0246228 A1 * | 11/2005 | Billingsley | 705/14 |

* cited by examiner

*Primary Examiner*—Chau Nguyen
*Assistant Examiner*—Rhonda Murphy
(74) *Attorney, Agent, or Firm*—Baker Botts. L.L.P.

(57) ABSTRACT

A method and system for providing on-hold content in a voice over Internet Protocol (VoIP) environment includes receiving an indication of a call on-hold. On-hold content for the call may be selected based on revenue generation criteria such as, for example, prices advertisers and other content providers are willing to pay for provisioning of their content to the call.

41 Claims, 3 Drawing Sheets

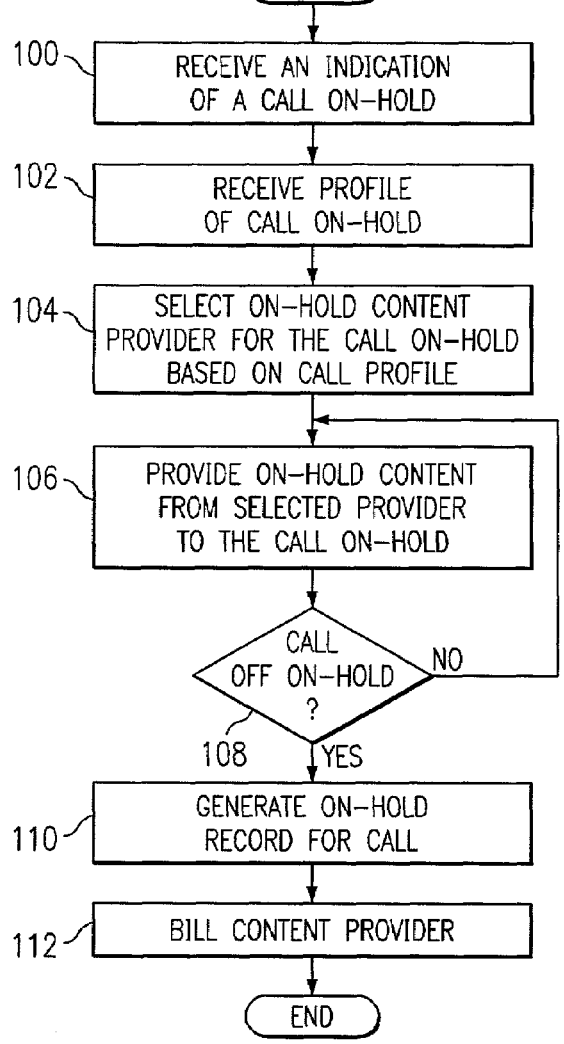
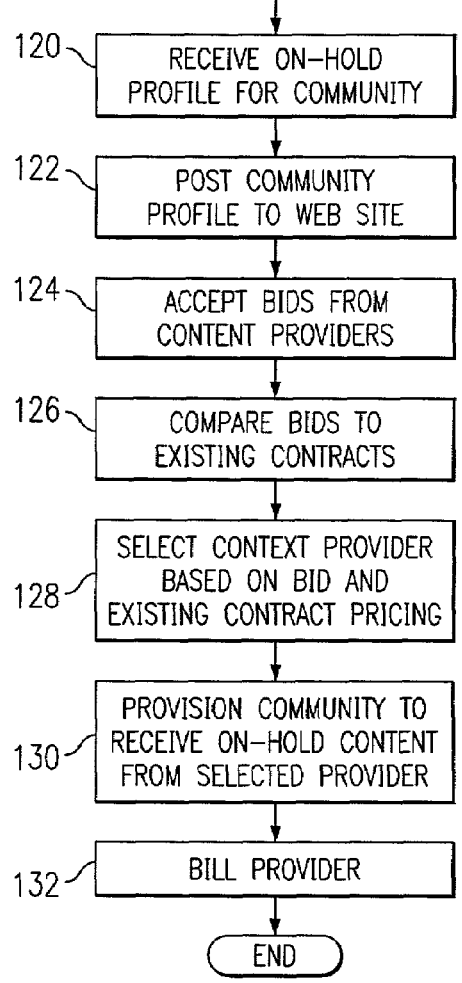
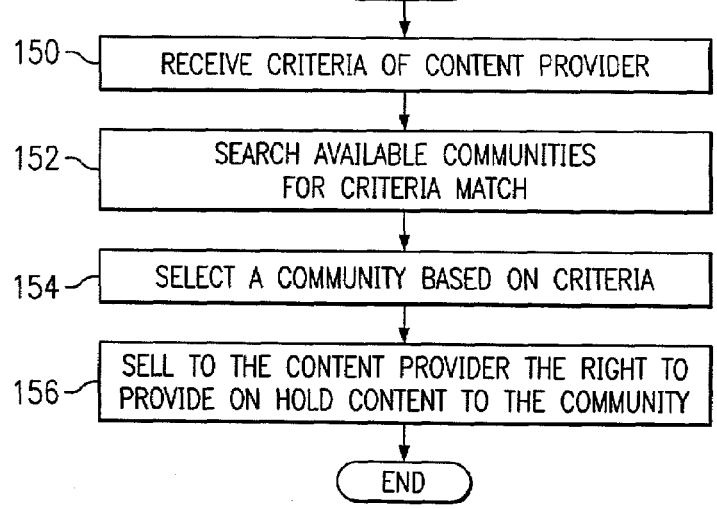

SYSTEM AND METHOD FOR PROVIDING ON-HOLD CONTENT IN A VOICE OVER INTERNET PROTOCOL (VOIP) ENVIRONMENT

TECHNICAL FIELD OF THE INVENTION

The present invention relates generally to the field of packet based communication networks, and more particularly to a system and method for providing on-hold content in a voice over Internet Protocol (VoIP) environment.

BACKGROUND OF THE INVENTION

Telecommunication networks include circuit-switched networks such as plain old telephone service (POTS) and packet-switched networks such as the Internet Protocol (IP) network to transport voice and data between remote end users. The circuit-switched networks utilize transmission paths dedicated to specific users for the duration of a call and employ continuous, fixed bandwidth transmission. The packet-switched networks allow dynamic bandwidth, and can be connectionless networks with no dedicated circuit or connection-oriented networks with virtual circuits having dedicated bandwidth along a predetermined path. Because packet-switched networks allow traffic from multiple users to share communication links, these networks use available bandwidth more efficiently than circuit-switched networks.

IP networks are connectionless packet-switched networks that format streams of information into addressable packets. Each IP packet includes source and destination addresses and can take any available route between the source and destination. The IP packets are transmitted independently and then reassembled in the proper sequence at the destination.

Telephone calls and other voice traffic may be transmitted in an IP network using voice over IP (VoIP). In a VoIP environment, music-on-hold is implemented using music-on-hold servers that unicast or multicast music-on-hold streams. For better network utilization, multicast is usually preferred. Multicast streams are played out to endpoints or to trunking endpoints, which then transmit music to other endpoints that are placed on-hold. Typically, a call manager identifies predefined music-on-hold streams and/or servers for use by endpoints and takes action in case the identified music-on-hold servers fail. In a peer-to-peer communication environment, the music-on-hold servers are accessed without the control of a central call manager.

SUMMARY OF THE INVENTION

The present invention provides a system and method for providing on-hold content in a voice over Internet Protocol (VoIP) environment that substantially eliminates or reduces the problems and disadvantages associated with previous methods and systems. In a particular embodiment, organizations may sell advertising space on their music or other suitable on-hold streams and thus may collect revenue from their captive audience who are on-hold and listening to the provided content.

In accordance with one embodiment of the present invention, a system and method for providing on-hold content in a voice over Internet Protocol (VoIP) environment includes receiving an indication of a call on-hold. On-hold content for the call may be selected based on revenue generation criteria.

In a particular embodiment, profile information for the call on-hold may be received and selection of the on-hold content based on the revenue generation criteria and the profile information. The profile information may comprise information interactively obtained from an on-hold party to the call, calling party information and/or call party information. The revenue generation criteria may comprise prices content providers are willing to pay for provisioning of their on-hold content to the call.

Technical advantages of the present invention include an improved system and method for providing on-hold content in a VoIP or other suitable packet-switched environment. In particular, the method and system allows organizations to sell advertising space on their music-on-hold streams. As a result, such organizations are able to collect revenues from captive audiences that they control such as, for example, the people who are on-hold and listening to the provided content. The airtime of callers on-hold may be sold to advertising companies, auctioned to the highest bidding advertising company, or otherwise used as a revenue source.

Another technical advantage of the present invention includes providing a method and system for advertising agencies and other companies to better focus and tailor their advertisements to the appropriate audiences. In particular, specific advertisers may be connected to users based on calling or call number matches, geographical location of the on-hold party, on the basis of application-specific information and other suitable call-specific information. In addition, advertisers pay for a known number of listeners and precise accounting can be maintained for the actual listener minutes of advertising provided to the listener.

Still another technical advantage of the present invention includes providing advertisers with the choice of providing multicast streams, unicast streams and/or audio files. In particular, advertisers may be freed from the effort of providing multicast streams and instead provide unicast streams to a network server which converts the unicast streams into multicast streams for delivery to calls on-hold. Thus, resources of a content provider are reduced.

Other technical advantages of the present invention will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 4 is a flow diagram illustrating a method providing on-hold content in the communications system of FIG. 1 in accordance with one embodiment of the present invention;

FIG. 5 is a flow diagram illustrating a method for providing on-hold content in the communications system of FIG. 1 in accordance with another embodiment of the present invention; and FIG. 6 is a flow diagram illustrating a method for providing on-hold content in the communications system of FIG. 1 in accordance with still another embodiment of the present invention.

DETAILED DESCRIPTION OF THE INVENTION

Figure 1:
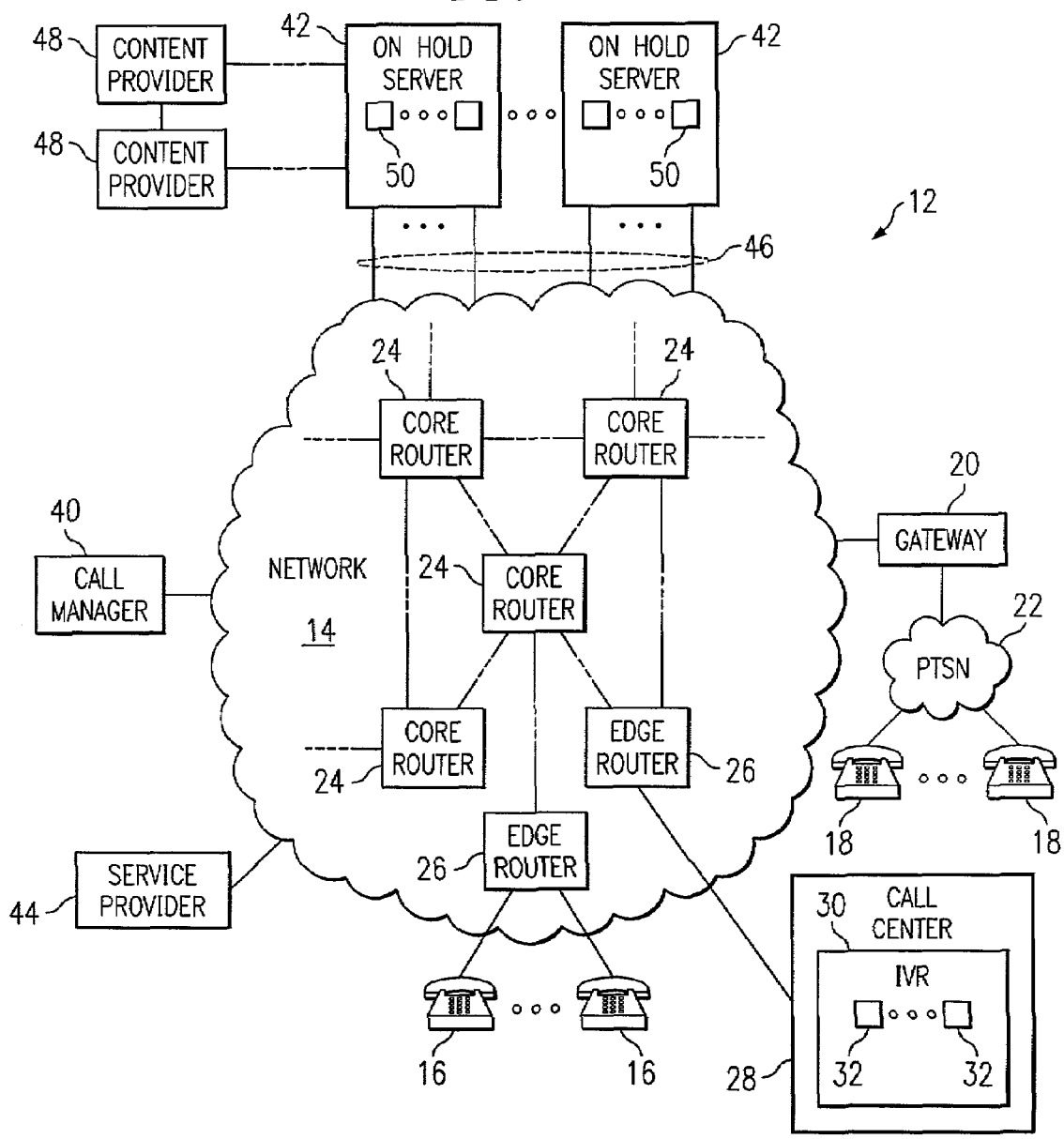
FIG. 1 is a block diagram illustrating a communications system in accordance with one embodiment of the present invention.

FIG. 1 illustrates a communications system 12 in accordance with one embodiment of the present invention. In this embodiment, the communications system 12 is a distributed system transmitting audio, video, voice, data and other suitable types of real-time and non-real-time traffic between source and destination endpoints.

Referring to FIG. 1, the communications system 12 includes a network 14 connecting a plurality of communication devices 16 to each other and to standard analog telephones 18 through a gateway 20 and the Public Switched Telephone Network (PSTN) 22. The communication devices 16, standard analog telephones 18 and gateway 20 are connected to the network 14 and/or PSTN 22 through twisted pair, cable, fiber optic, radio frequency, infrared, microwave and/or any other suitable wire line or wireless link 24.

In one embodiment, the network 14 is the Internet, a wide area network (WAN), a local area network (LAN), and/or any other suitable packet-switched network. In the Internet embodiment, the network 14 transmits Internet Protocol (IP) packets and includes a plurality of core routers 24, edge routers 26 and/or other suitable network elements operable to direct the IP packets between source and destination endpoints. Telephony voice information is transmitted in the voice over IP (VoIP) format. Real-time IP packets such as VoIP packets are encapsulated in real-time transport protocol (RTP) packets for transmission over the network 14. It will be understood that the network 14 may comprise any other suitable type of network and that traffic may be otherwise suitably transmitted in packets using other protocols and formats. The packets may be any suitable datagram, call or other unit including addressing and payboard information.

In the network 14, the core routers 24 are interconnected to each other and are connected between the edge routers 26. The core routers 24 as well as the edge routers 26 route IP packets based on address information. The routers 24 and 26 may be any suitable type of device operable to receive, process and transmit packets in the network 14. Thus, as used herein, the routers may be real routers, switches, add/drop multiplexors and the like.

The communication devices 16 comprise IP or other digital telephones, personal or other suitable computers or computing devices, personal digital assistance (PDAs), cell or other mobile telephones or any other suitable handheld or other device capable for communicating real-time audio, video and/or other information over the network 14. The communication devices 16 also communicate control information with the network 14 to control call set up, tear down and processing as well as call services such as call on-hold services.

In the Internet embodiment, the communication devices 16 communicate voice traffic in the VoIP format. The standard analog telephones 18 communicate standard telephony signals through PSTN 22 to the gateway 20. At the gateway 20, the signals are converted to IP packets in the VoIP format. As previously described, the IP packets from the communication devices 16 and the gateway 20 are encapsulated in the RTP protocol for transmission over the network 14.

A call center 28 may be connected to the network 14. The call center 28 may receive and process a plurality of calls for a company or other enterprise. Thus, for example, the call center 28 may be a product ordering center, a customer service center, a help center and the like.

The call center 28 may include operators and/or an auto attendant as well as an interactive voice response (IVR) system 30. The IVR system 30 interacts with callers to obtain personal, account and/or other suitable information for assisting in the call and/or providing services. In addition, based on the information obtained, the IVR or other system of the call center 28 may retrieve database or other records and/or information about or concerning the caller. As described in more detail below, some or all of the information obtained and/or retrieved for the call may form a profile for the caller, and thus the call, and be used in providing on-hold content to the call. The profile information may include a type of queue 32 in which the call is queued by call center applications, such as IVR system 30, when waiting to be served. For example, the call may be queued in a high-priority, low priority or other suitable queue 32.

The communication devices 16, gateway 20 and call center 28 each comprise an IP endpoint at which packets are converted into video, audio, analog and/or other suitable signals for display, play and/or other suitable presentation to the user or further forwarding to the user over a non-IP network. As used herein, the term each means every one of at least a subset of the identified items. The call on-hold may be a telephony call, a video call, a conference call or other suitable connection or session between user devices, computers, and/or other suitable equipment.

A call manager 40, on-hold servers 42 and service provider servers and/or service provider site 44 may be connected to the network 14. The call manager 40 and servers 42 and service provider site 44 may each be located in a central facility or have their functionality distributed across and/or at the periphery of the network 14. The call manager 40, servers 42 and service provider site 44 are connected to the network 14 by any suitable type of wire line or wireless links.

The call manager 40 sets up, tears down and otherwise manages calls across the network 14. The calls may be any suitable types of communication connection and may be between two or more parties. The parties may be persons and/or equipment such as computers. The connections may be real-time connections, connections having real-time characteristics and/or non-real-time connections. In a particular embodiment, network 14 may operate without the call manager 40, in which case the communication devices 16 and gateway 20 and other elements may communicate control information directly with each other or with other suitable network elements.

The call manager 40 is responsive to service requests from the communication devices 16, the gateway 20 and the call center 28. For example, the call manager 40 may control establishment of connections between endpoints, provide services and call features, and bridging, multicasting, call hold and other suitable services for the communication devices 16 and standard telephones 18. In one embodiment, the call manager 40 is responsive to control call on-hold signals initiated by the communication devices 16, gateway 20, call center 28 or other endpoint. In this embodiment, the call manager 40 may direct the endpoint to use a specified music-on-hold channel or server or other specific on-hold content. The on-hold content may be specified, for example, by identifying a server, other suitable source or a multicast or other channel.

The on-hold servers 42 may each store, generate, convert or otherwise transmit and/or provide one or more channels of on-hold content 46 to the network 14. The on-hold content may be unicast or multicast channels, or streams on links 46. Typically, the on-hold content 46 is multicast for better network utilization. The on-hold content 46 may be otherwise suitably transmitted within the network 14.

The on-hold content 46 may be music-on-hold and may comprise advertising. For example, the advertising messages may be commercials and/or promotions of products and services of a company. The advertising messages may be intermixed with music, news and other contents to keep the attention of an on-hold caller.

In one embodiment, the on-hold content 46 is provided to the on-hold servers 42 by content providers 48 over network and other suitable links. In this embodiment, the content providers 48 may unicast the content to the on-hold serves 42 which may then multicast the content to on-hold calls throughout the network 14. In another embodiment, the content providers 48 may provide the on-hold content in audio and other files 50 stored on the on-hold servers 42. In yet another embodiment, the content providers 48 may provide the on-hold content in Voice extensible Markup Language (VXML) format.

The service provider site 44 communicates with the call manager 40 and/or terminal devices 16, 20 and 28 to provide on-hold content to calls on-hold. The service provider 44 may provide the content by selecting and indicating the content to the call manager 40 and/or terminal devices 16, 20 and 28. In one embodiment, as described in more detail below, the service provider 44 selects content based on revenue generation criteria. The revenue generation criteria comprises information indicative of revenue that can be earned and/or generated by selling or otherwise providing on-hold streams to calls on-hold. The criteria may be revenue that can be earned based on fixed, preexisting contracts and/or bids from auctioning the air time of callers on-hold. Selection of an on-hold stream may also be based on profile information about the caller on-hold, which may be part of the revenue generation criteria. In this way, organizations are able to collect revenue from people who are on-hold waiting for services. In addition, where caller profile information is used, advertising may be directed based on the type of caller, the geographic location of the caller and other call-specific information. Furthermore, service provider site 44 may provide advertising companies with statistics regarding communities of callers on hold and allow the advertising companies to bid to acquire the on-hold time of the callers. Also, in response to queries by advertising companies, the service provider site 44 may search profile information of available communities.

Figure 2:
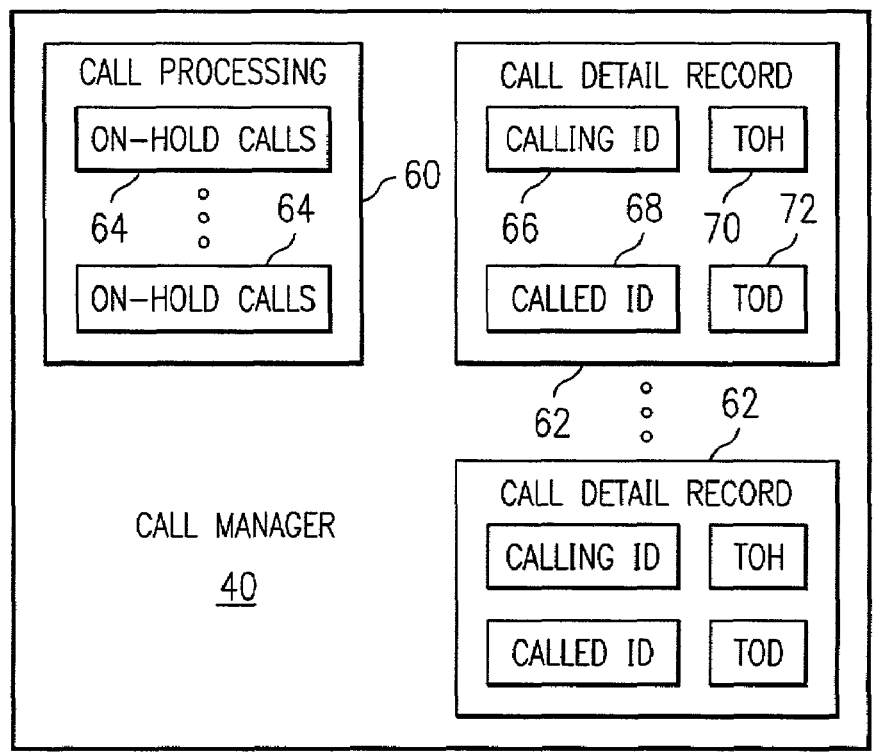
FIG. 2 is a block diagram illustrating details of the call manager of FIG. 1 in accordance with one embodiment of the present invention.

FIG. 2 illustrates details of the call manager 40 in accordance with one embodiment of the present invention. In this embodiment, the call manager 40, other components of the network 14 or system 12 may comprise logic encoded in media for carrying out function of the elements. The logic comprises functional instructions for carrying out programmed tasks. The media comprises computer disks or other suitable computer-readable media, application specific integrated circuits (ASIC), field programmable gate arrays (FPGA), digital signal processor (DSP) or other suitable specific or general purpose processors, transmission media or other suitable media in which logic may be encoded and utilized.

Referring to FIG. 2, the call manager 40 includes a call processing module 60 and a plurality of call detail records 62. The call processor 60 may set up, tear down and provide on-hold and other requested services for calls in the network 14. In one embodiment, the call processor 60 monitors and exposes on-hold call information 64 for individual calls or for groups of calls such as from a given service. It will be understood that functionality of the call manager 40 as well as other elements of the system 12 may be otherwise combined and/or distributed without departing from the scope of the present invention.

The on-hold call information 64 may include a number of calls on-hold for the service and/or profile information for the calls. The on-hold call information 64 may be used in selecting a fixed contractual arrangement for providing on-hold content to a call or a service or to auction a listener or community of listeners rather than sell air time based on a preexisting and/or fixed contractual arrangement. The on-hold call information 64 may be collected by, for example, an Interactive Voice Response System (IVR).

The call detail record 62 may be generated for each call and/or for each call placed on-hold. The record may be generated contemporaneously with placement of the call, at placement of the call on-hold and/or partially at or after the conclusion of the on-hold period. In one embodiment, the call detail record 62 includes a calling party ID 66 a call party ID 68, a time of hold 70 and time of day of the call 72. If the call detail record 62 is generated at the beginning of the call, time of hold, which may be estimated, and other information may be added to the record during or at the completion of the on-hold period. It will be understood that the call detail record 62 need not be a component of call manager 40. Call detail record 62 may reside, for example, on a separate server or otherwise located elsewhere in system 12.

The calling party ID, call party ID and time of day information 66, 68 and 72 may provide information for individual calls and may be used by the service provider 44 in selecting on-hold content for the call. The estimated length of time of hold information 70 as well as the profile information may be used in determining, based on a contractual arrangement, revenue generated by the provision of on-hold content and owed by the content provider. As described below, the call detail record 64 may thus be used by a billing system in the service provider 44 or other element of the network 14.

Figure 3:
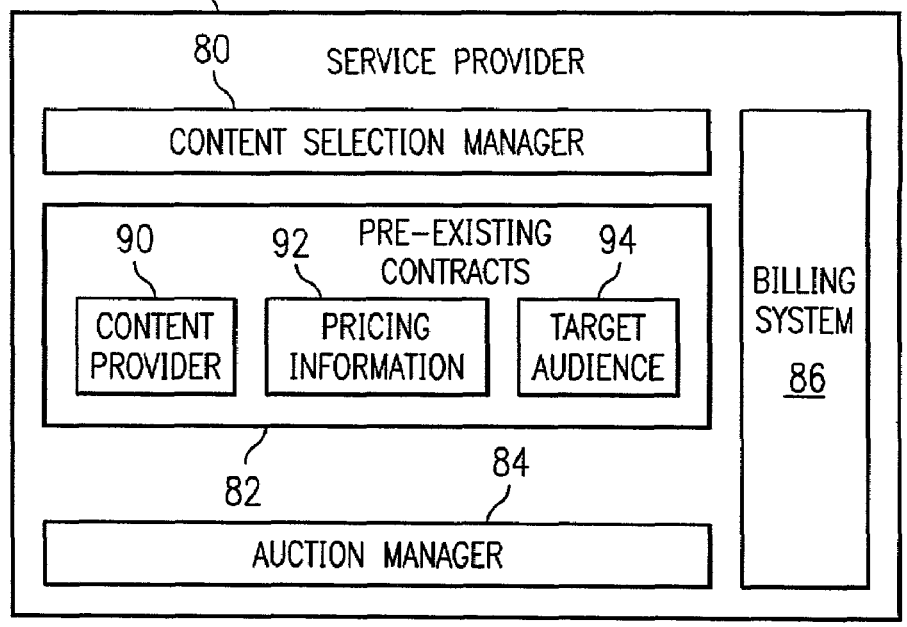
FIG. 3 is a block diagram illustrating details of the service provider of FIG. 1 in accordance with one embodiment of the present invention.

FIG. 3 illustrates details of the service provider 44 in accordance with one embodiment of the present invention. In this embodiment, the service provider 44 may comprise a server including a website. As described in connection with the call manager 40, the service provider 44 may comprise logic encoded in media for carrying out functionality of the system 12. It will be understood that functionality of the service provider 44 as well as other elements of the system 12 may be otherwise combined and/or distributed without departing from the scope of the present invention.

Referring to FIG. 3, the service provider 44 includes a content selection manager 80, preexisting contracts 82, auction manager 84 and billing system 86. The content selection manager 80 receives an indication of a call on-hold and/or a number of users on-hold for a given service and selects on-hold content for the call or service based on preexisting contracts 82 and/or an auction conducted by the auction manager 84. In selecting on-hold content, the content selection manager 80 may receive profile information for the corresponding call and/or service, may submit bids through the action manager 84, may search the preexisting contracts 82 or other database and may base decisions on predefined or otherwise specified revenue generation or other criteria. In one embodiment, the content selection manager 80 may utilize preexisting contracts 82 or the auction manager 84. In another embodiment, the content selection manager 80 may utilize both preexisting contacts and an auction and select on-hold content providing the greatest revenue.

The preexisting contracts 82 may be a database, a table or other data structure including content provider identifiers 90, pricing information 92 for the provider and/or channels of the provider and target audience information 94 to which the content provider 90 is willing to pay to sell advertising space in on-hold streams. In a particular embodiment, the pricing information 92 may include a plurality of prices that the content provider is willing to pay based on call profile, time of day and other suitable criteria. The pricing information may be a pricing rate, for example, price per minute, or on a call or service basis.

The target audience information 94 comprises profile information associated with the pricing information. Thus, for a given profile, the price that each content provider is willing to pay may be determined. The target audience information 94 may include calling or called numbers, or include application-specific information such as the type of IVR queue 32 in which a call is waiting.

The auction manager 84 auctions air time to callers on-hold. In one embodiment, the auction manager 84 may post profile information of a call and/or service and solicit or accept bids from content providers, such as advertisers and other entities for providing the on-hold content. After a specified period of time, the auction manager may close bidding and the content selection manager 80 may then select the content provider with the highest bid.

The billing system 86 bills the content providers 48 based on the preexisting contracts 82 or bids accepted through the auction manager 84. The billing may be done on a per-call or per-service basis and may be based on a fixed price per call or based on a rate. Where billing is based on a rate, the billing system may access and/or otherwise interact with the call manager 40 to determine time of hold 70 for the corresponding call or sets of calls. In this way, precise accounting can be maintained for the actual listener-minutes of advertising provided to a listener.

FIG. 4 illustrates a method for providing on-hold content in a packet-switch network in accordance with one embodiment of the present invention. In this embodiment, air time of callers on-hold is sold based on preexisting contractual arrangements.

Referring to FIG. 4, the method begins at step 100 in which indication of a call on-hold is received. The call on-hold indication may be initially received by the call manager 40 and passed to the service provider 44. At step 102, a profile for the call on-hold is received. The profile may be generated by the call manager 40 in the call detail record 62 and communicated to or accessed by the service provider 44. In another embodiment, the profile may be generated by the IVR 30, a terminal device or other suitable element or combination of elements attached to the network 14.

Proceeding to step 104, the service provider 44 selects on-hold content for the call on-hold based on the call profile and revenue that can be generated given the call profile. In a particular embodiment, the on-hold content may be the content with the greatest revenue generation criteria. The content may be selected by selecting a provide and/or a particular channel of the provider.

At step 106, the service provider 44 provides the on-hold content to the call on-hold. The service provider 44 may provide the on-hold content by itself providing the content to an end-point, by instructing the call manager 40 or other entity to provide the on-hold content or by indicating the selected on-hold content to the call manager 40 or other entity.

At decisional step 108, a determination is made whether the call is off on-hold. The call may be determined to be off on-hold when an indication is received from the endpoint or other suitable device. If the call remains on-hold, the process follows the No branch, returning to step 106 where on-hold content continues to be provided. If the call is off on-hold, the process continues along the Yes branch to step 110. At step 110, an on-hold record is generated for the call. In one embodiment, the on-hold record may be part of the call detail record 66 generated and maintained by the call manager 40. The on-hold record comprises the time of hold and other suitable information. In a particular embodiment, the on-hold record may be generated at the end of the call to encapsulate all time during the call at which the call was on-hold.

At step 112, the content provider of the selected content is billed. The content provider may be billed through billing system 68 of the service provider 44 or through other suitable mechanisms. In this way, organizations may sell advertising space on their on-hold streams and collect revenues from captive audiences. In addition, advertising agencies may focus and tailor their advertisements to the appropriate audiences and pay only for known number of listeners and for actual listener minutes of advertising.

FIG. 5 illustrates a method for providing on-hold content in accordance with another embodiment of the present invention. In this embodiment, on-hold content for a service such as a community of listeners is selected based on an auction.

Referring to FIG. 5 the method begins at step 120 in which the service provider 44 receives an on-hold profile for a community of listeners. The community may comprise a business such as a store, a chain of stores, a hospital, a clinic, a government agency or other suitable entity.

Proceeding to step 122, the auction manager 84 posts the community profile to a website for review and bidding by content providers 48. At step 124, the auction manager 84 accepts bids from content providers 48. At step 126, the auction manager 84 and/or content selection manager 80 may compare the bids to each other and/or to existing contracts.

Proceeding to step 128, the content selection manager 80 selects a content provider 48 based on the received bids and/or existing contract pricing. In a particular embodiment, the content selection manager 80 may select a content provider 48 offering to pay the highest overall price or rate for provision of its content. In other embodiments, the content selection manager 80 may weigh the type of content, quality of the content streams and other suitable criteria together with pricing information in selecting the on-hold content.

At step 130, the service provider 44 provisions the community to receive the on-hold content from the selected provider. The provisioning may be accomplished by instructing the call manager 40 to identify to calls on-hold from the community the content of the selected provider. At step 132, the selected provider is billed based upon the agreed-upon price for provision of the content. The content provider may be billed upon reaching an agreement, on a daily or other periodic basic or at their conclusion of the contract.

FIG. 6 illustrates a method for providing on-hold content in accordance with still another embodiment of the present invention. In this embodiment, on-hold content is selected and sold to a content provider based on a query from the content provider and specified criteria.

Referring to FIG. 6, the method begins at step 150 in which criteria of the content provider is received. The criteria may specify a type of community in which the content provider is interested in providing on-hold content. For example, the criteria may specify a particular type of business such as a doctor's office, a lawyer's office, a help line and the like.

At step 152, the content selection manager 80 searches a listing of communities selling a right to provide content to their calls on hold for a match to the specified criteria. The list of communities may be stored in the service provider 44 or on a separate server. At step 154, a community is selected based on the criteria of the content provider. The match may be a best available match. In addition, if more than one community matches the criteria, the matching communities may be identified to the content provider for selection of one or more of the communities.

Proceeding to step 156, the right to provide the on-hold content to the community is sold to the content provider. As previously described, the content provider may be built before and/or after the content is provided to calls of the community placed on hold.

Although the present invention has been described with several embodiments, several changes and modifications may be suggested to one skilled in the art. It is intended that the present invention encompass such changes and modifications as fall within the full scope of the appended claims.

What is claimed is:

1. A method for providing on-hold content in a packet-switched network, comprising:
   receiving an indication of a call on-hold; and
   selecting on-hold content for the call based on revenue generation criteria, comprising:
      auctioning airtime of the call on-hold, comprising posting availability of the call on an Internet site along with profile information about the call and receiving bids for providing the on-hold content; and
      selecting on-hold content of a highest bidder at the auction.

2. The method of claim 1, further comprising generating revenue by providing the on-hold content to the call on-hold.

3. The method of claim 1, further comprising:
   receiving profile information for the call on-hold; and
   selecting the on-hold content for the call based on the revenue generation criteria and the profile information.

4. The method of claim 3, wherein the profile information comprises information interactively obtained from an on-hold party to the call.

5. The method of claim 3, wherein the profile information comprises calling party information.

6. The method of claim 3, wherein the profile information comprises called party information.

7. The method of claim 3, wherein the profile information comprises estimated on-hold time.

8. The method of claim 1, wherein selecting on-hold content for the call on-hold based on the revenue generation criteria comprises auctioning airtime of the call on-hold and selecting on-hold content of a highest bidder at the auction.

9. The method of claim 1, wherein the on-hold content at least substantially comprises advertising.

10. The method of claim 1, selecting the on-hold content for the call on-hold comprising selecting on-hold content from one of a plurality of providers with a pre-existing arrangement to pay for providing on-hold content to calls on-hold.

11. The method of claim 1, further comprising delivering the on-hold content.

12. The method of claim 11, wherein the on-hold content is delivered in an audio file format.

13. The method of claim 11, wherein the on-hold content is delivered in Voice eXtensible Markup Language (VXML) format.

14. A system for providing on-hold content in a packet-switched network, comprising:
   means for receiving an indication of a call on-hold; and
   means for selecting on-hold content for the call based on revenue generation criteria, comprising:
      means for auctioning airtime of the call on-hold operable to post availability of the call on-hold on an Internet site along with profile information about the call on-hold and to receive bids for providing the on-hold content; and
      means for selecting on-hold content of a highest bidder at the auction.

15. The system of claim 14, further comprising means for generating revenue by providing the on-hold content to the call on-hold.

16. The system of claim 14, further comprising:
   means for receiving profile information for the call on-hold; and
   means for selecting the on-hold content for the call based on the revenue generation criteria and the profile information.

17. The system of claim 16, wherein the profile information comprises information interactively obtained from an on-hold party to the call.

18. The system of claim 16, wherein the profile information comprises calling party information.

19. The system of claim 16, wherein the profile information comprises called party information.

20. The system of claim 16, wherein the profile information comprises estimated on-hold time.

21. The system of claim 14, wherein the means for selecting on-hold content for the call on-hold based on the revenue generation criteria comprises means for auctioning airtime of the call on-hold and selecting on-hold content of a highest bidder at the auction.

22. The system of claim 14, wherein the on-hold content at least substantially comprises advertising.

23. The system of claim 14, the means for selecting the on-hold content for the call on-hold comprising means for selecting on-hold content from one of a plurality of providers with a pre-existing arrangement to pay for providing on-hold content to calls on-hold.

24. The system of claim 14, further comprising a means for delivering the on-hold content.

25. The system of claim 24, wherein the on-hold content is delivered in an audio file format.

26. The system of claim 24, wherein the on-hold content is delivered in Voice eXtensible Markup Language (VXML) format.

27. A system for providing on-hold content in a packet-switched network, comprising:
   logic encoded in media; and
   the logic operable to:

receive an indication of a call on-hold; and
select on-hold content for the call on-hold based on revenue generation criteria by:
  auctioning airtime of the call on-hold by posting availability of the call on an Internet site along with profile information about the call and receiving bids for providing the on-hold content; and
  selecting on-hold content of a highest bidder at the auction.

28. The system of claim 27, the logic further operable to providing the on-hold content to the call on-hold to generate revenue.

29. The system of claim 27, the logic further operable to receive profile information for the call on-hold and to select the on-hold content for the call on-hold based on the revenue generation criteria and the profile information.

30. The system of claim 29, wherein the profile information comprises information interactively obtained from an on-hold party to the call.

31. The system of claim 29, wherein the profile information comprises calling party information.

32. The system of claim 29, wherein the profile information comprises called party information.

33. The system of claim 29, wherein the profile information comprises estimated on-hold time.

34. The method of claim 27, the logic operable to select on-hold content for the call on-hold based on revenue generation by auctioning airtime of the call on-hold and selecting on-hold content of a highest bidder at the auction.

35. The system of claim 27, wherein the on-hold content at least substantially comprises advertising.

36. The system of claim 27, the logic operable to select the on-hold content for the call on-hold by selecting on-hold content from one of a plurality of providers with a pre-existing arrangement to pay for providing on-hold content to calls on-hold.

37. The system of claim 27, the logic further operable to deliver the on-hold content.

38. The system of claim 37, wherein the on-hold content is delivered in an audio file format.

39. The system of claim 37, wherein the on-hold content is delivered in Voice extensible Markup Language (VXML) format.

40. A method for selling advertising in a voice over Internet protocol (VoIP) network, comprising:
  receiving profile information for a community;
  providing the profile information to one or more service providers to bid to provide on-hold content to calls of the community placed on hold; and
  auctioning a right to provide on-hold content to calls of the community placed on hold.

41. A method for selling advertising in a voice over Internet protocol (VoIP) network, comprising:
  receiving criteria of a content provider, the criteria specifying a type of community the content provider is interested in providing content for calls on hold;
  selecting a community selling a right to provide content to its calls on hold based on the criteria; and
  selling to the content provider the right to provide the on-hold content.

* * * * *